(12) United States Patent
Kumar et al.

(10) Patent No.: US 7,817,727 B2
(45) Date of Patent: Oct. 19, 2010

(54) HYBRID OUTPUT DRIVER FOR HIGH-SPEED COMMUNICATIONS INTERFACES

(75) Inventors: Rohit Kumar, San Jose, CA (US); Emerson S. Fang, Fremont, CA (US)

(73) Assignee: GLOBALFOUNDRIES, Inc., Grand Cayman (KY)

( * ) Notice: Subject to any disclaimer, the term of this patent is extended or adjusted under 35 U.S.C. 154(b) by 650 days.

(21) Appl. No.: 11/756,678

(22) Filed: Jun. 1, 2007

(65) Prior Publication Data

US 2008/0034378 A1 Feb. 7, 2008

Related U.S. Application Data

(63) Continuation-in-part of application No. 11/668,010, filed on Jan. 29, 2007, which is a continuation-in-part of application No. 11/614,529, filed on Dec. 21, 2006.

(60) Provisional application No. 60/786,546, filed on Mar. 28, 2006.

(51) Int. Cl.
*H04B 3/00* (2006.01)
(52) U.S. Cl. ...................................................... 375/258
(58) Field of Classification Search ................. 375/244, 375/258, 295, 377; 327/52, 89, 108; 330/253
See application file for complete search history.

(56) References Cited

U.S. PATENT DOCUMENTS

| 5,742,798 | A | 4/1998 | Goldrian |
| 6,300,802 | B1 | 10/2001 | Smetana |
| 6,433,579 | B1 | 8/2002 | Wang et al. |
| 6,437,599 | B1 | 8/2002 | Groen |
| 6,445,223 | B1 | 9/2002 | Thilenius |
| 6,504,397 | B1 | 1/2003 | Hart et al. |
| 6,664,814 | B1 | 12/2003 | Evans et al. |
| 6,665,347 | B2 * | 12/2003 | van Bavel et al. ........... 375/257 |
| 6,919,742 | B1 * | 7/2005 | McGlinchey ............... 327/108 |
| 6,940,302 | B1 | 9/2005 | Shumarayev et al. |
| 7,145,359 | B2 | 12/2006 | Hein et al. |
| 7,317,769 | B2 | 1/2008 | Tonietto et al. |

(Continued)

OTHER PUBLICATIONS

"Emitter Coupled Logic," Wikipedia, downloaded Mar. 21, 2007 from URL: http://en.wikipedia.org/wiki/ Emitter_Coupled_Logic, 3 pages.

(Continued)

*Primary Examiner*—Khanh C Tran
(74) *Attorney, Agent, or Firm*—Zagorin O'Brien Graham LLP (57) ABSTRACT

A driver circuit that consumes less current than other driver circuits combines a current-mode driver circuit with a voltage-mode driver circuit to provide impedance matching and signal equalization operations. In at least one embodiment of the invention, an apparatus includes a differential node and a driver circuit configured to generate a signal on the differential node. The driver circuit includes a first circuit portion configured to generate a first signal on the differential node based, at least in part, on a data signal. The first signal has a voltage swing based, at least in part, on a voltage on a power supply node. The driver circuit includes at least a second circuit portion configured to generate a current through the differential node based, at least in part, on a first bit-time of the data signal and an equalization operation, thereby adjusting the voltage swing of the signal.

19 Claims, 6 Drawing Sheets

U.S. PATENT DOCUMENTS

| | | |
|---|---|---|
| 7,483,688 B2 * | 1/2009 | Huang et al. ............... 455/402 |
| 7,643,563 B2 * | 1/2010 | Huang et al. ............... 375/257 |
| 2003/0128767 A1 | 7/2003 | Kudoh |
| 2004/0047409 A1 | 3/2004 | Lee et al. |
| 2005/0089126 A1 | 4/2005 | Zerbe et al. |
| 2007/0075776 A1 | 4/2007 | Garlapati et al. |
| 2007/0182615 A1 * | 8/2007 | Aliahmad et al. ........... 341/154 |
| 2007/0230513 A1 | 10/2007 | Talbot et al. |
| 2007/0230553 A1 | 10/2007 | Talbot et al. |

OTHER PUBLICATIONS

Heydari, Payam, "Design Issues in Low-Voltage High-Speed Current-Mode Logic Buffers," ACM Great Lakes Symposium on VLSI 2003, Apr. 28-29, 2003, 6 pages.

Non-Final OA mailed May 25, 2010 in U.S. Appl. No. 11/614,529, 11 pages.

* cited by examiner

HYBRID OUTPUT DRIVER FOR HIGH-SPEED COMMUNICATIONS INTERFACES

CROSS-REFERENCE TO RELATED APPLICATION(S)

This application is a continuation-in-part of application Ser. No. 11/614,529, filed Dec. 21, 2006, entitled "In-Band Method to Configure Equalization Levels," which application claims the benefit under 35 U.S.C. §119 of provisional application No. 60/786,546, filed Mar. 28, 2006, entitled "Method and Apparatus for Link Operations," which applications are hereby incorporated by reference.

This application is a continuation-in-part of application Ser. No. 11/668,010, filed Jan. 29, 2007, entitled "Transmitter Voltage and Receiver Time Margining," which application claims the benefit under 35 U.S.C. §119 of provisional application No. 60/786,546, filed Mar. 28, 2006, entitled "Method and Apparatus for Link Operations," which applications are hereby incorporated by reference.

BACKGROUND

1. Field of the Invention

This application is related to integrated circuits and more particularly to data communications links between integrated circuits.

2. Description of the Related Art

In general, industry standards for high-speed data communications links may require that a transmit interface satisfy various specifications including output impedance specifications and static power consumption specifications. For example, the output impedance of a typical driver circuit of an exemplary transmit interface substantially matches a particular termination impedance (e.g., an output impedance of 50 Ohms on each node of a differential output node to match a load of 100 Ohms) to reduce signal reflections. In addition, for a particular application, that same driver may need to meet a particular power consumption specification (e.g., a transmit interface operating at a bit rate in the range of approximately 400 Million Transfers per second (MT/s) to approximately 2.8 GT/s may have a maximum power consumption in the range of approximately 5.5 mW to approximately 14.2 mW of DC power per output bit). In addition, at high-data rates, the particular application may require the transmit interface to implement equalization techniques to counter predictable effects of channel distortion on the signal. Accordingly, techniques for transmitting differential signals over a communications link that meet performance requirements of communications applications are desired.

SUMMARY

A driver circuit that consumes less current than other driver circuits combines a current-mode driver circuit with a voltage-mode driver circuit to provide impedance matching and signal equalization operations. In at least one embodiment of the invention, an apparatus includes a differential node and a driver circuit configured to generate a signal on the differential node. The driver circuit includes a first circuit portion configured to generate a first signal on the differential node based, at least in part, on a data signal. The first signal has a voltage swing based, at least in part, on a voltage on a power supply node. The driver circuit includes at least a second circuit portion configured to generate a current through the differential node based, at least in part, on a first bit-time of the data signal and an equalization operation, thereby adjusting the voltage swing of the signal.

In at least one embodiment of the invention, a method for generating a signal on a differential node includes generating an output signal on the differential node based, at least in part, on a data signal. The output signal has a voltage swing based, at least in part, on a voltage on a power supply node. The method includes adjusting the voltage swing by establishing a differential current through the differential node based, at least in part, on a first bit-time of the data signal and an equalization operation.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
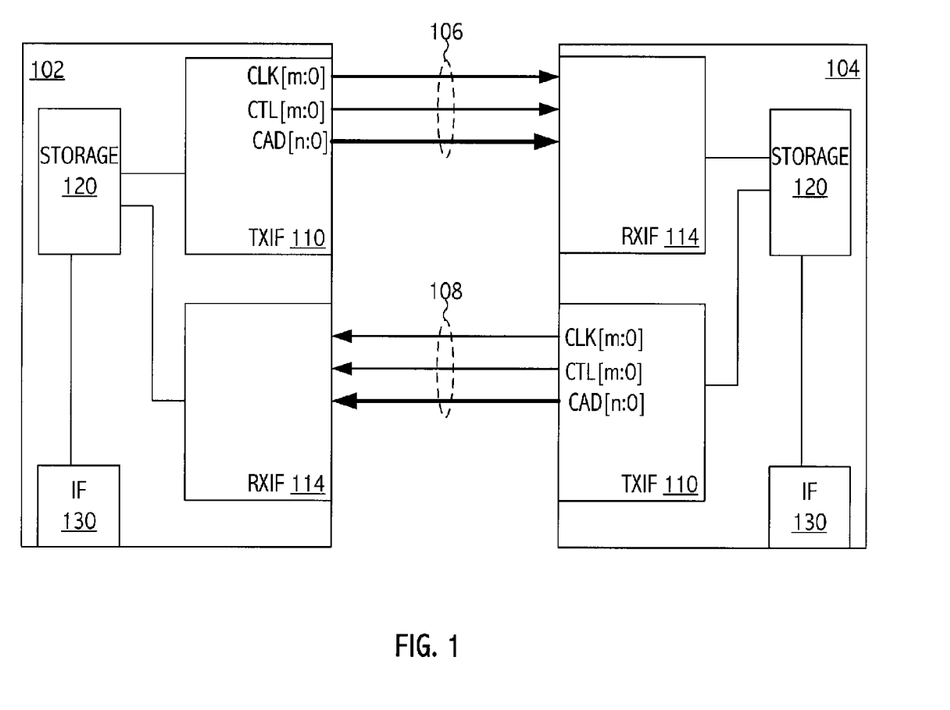
FIG. 1 illustrates a block diagram of two integrated circuit devices coupled by a communications link consistent with one or more embodiments of the present invention.

Referring to FIG. 1, integrated circuit 102 communicates with integrated circuit 104 by an exemplary communications link including transmit interfaces 110, receive interfaces 114, and communications paths 106 and 108, which include respective, individual communications paths for clock signals (e.g., CLK[m:0]), control signals (e.g., CTL[m:0]), and data signals (e.g., n-bits of commands, addresses, or data, i.e., CAD[n:0]). Those individual communications paths may be single-ended or differential communications paths. In at least one embodiment of the communications link, a bit-time is half a clock period in duration, i.e., two data bits (e.g., two CAD[n:0] bits or two CTL[m:0] bits) are transmitted on a corresponding communications path per clock cycle (e.g., a period of a respective one of CLK[m:0]). However, the teachings herein may be adapted for bit-times having one clock period in duration (i.e., one data bit is transmitted on a corresponding communications path per clock cycle) or for other suitable bit-time durations. Communications paths 106 and 108 are unidirectional, i.e., communications paths 106 provide paths from integrated circuit 102 to integrated circuit 104 and communications paths 108 provide paths to integrated circuit 102 from integrated circuit 104. Integrated circuit 102 includes a sideband control mechanism (e.g., interface 130) that provides access to control and/or status registers internal to integrated circuit 102 (e.g., locations in storage circuit 120). Interface 130 may be a Joint Test Action Group (i.e., JTAG) interface, System Management Bus (i.e., SMBus) interface, or other suitable interface. In at least one embodiment, interface 130 communicates test, characterization, and/or diagnostic information between the corresponding integrated circuit and an external processing device (not shown).

Transmit interfaces 110 include driver circuits that supply signals to individual paths of communications paths 106 and 108 for receipt by receive interfaces 114. In general, a driver circuit, as referred to herein, is a circuit that receives a signal and supplies a version of that signal for use by another circuit. A driver circuit may be responsive to generate single-ended signals or differential signals. An exemplary differential output node of transmit interface 110 is coupled to an input node of receive interface 114 by an individual path of communications paths 106 and 108 (e.g., traces on printed circuit board), which are finite-length transmission lines. To reduce signal reflections and corresponding signal degradation on those transmission lines, the differential output node of transmit interface 110 and the differential input node of receive interface 114 are designed to have an impedance (e.g., a differential impedance of 100 Ohms) that makes the finite-length transmission lines behave as if they are infinite in length, i.e., the output impedance of a driver circuit on the transmit interface and a termination impedance on the receiver interface coupled to individual transmission lines have a value approximately equal to the characteristic impedance of a corresponding transmission line.

Figure 2:
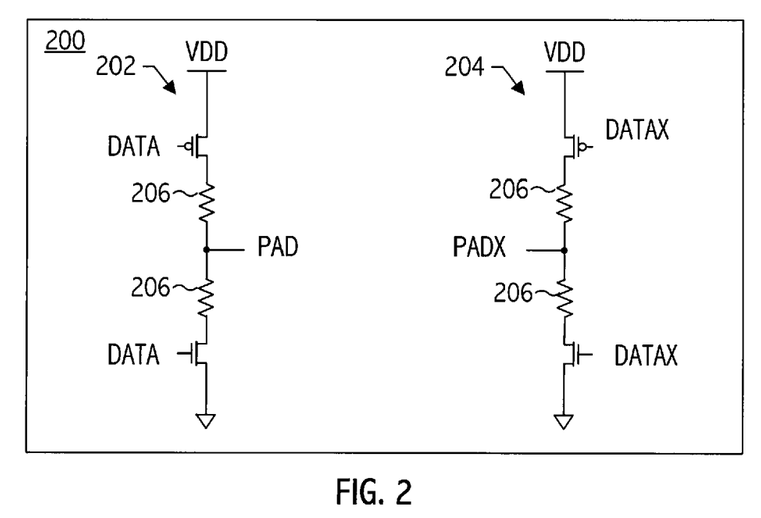
FIG. 2 illustrates a circuit diagram of an exemplary voltage mode driver.

Referring to FIG. 2, an exemplary driver circuit e.g., differential voltage mode driver circuit 200, which is formed by voltage mode driver circuits 202 and 204, is configured to receive a differential data signal on a differential node (e.g., the differential data signal received on differential node DATA and DATAX) and supply a version of that signal to a differential output node (e.g., the differential node PAD and PADX). Resistors 206 in combination with a corresponding one of the pull-up and pull-down transistors (e.g., having a combined resistance equal to approximately 50 Ohms) are used to match the characteristic impedance of a respective transmission line (e.g., a differential impedance of approximately 100 Ohms), in order to reduce reflections. In general, the output voltage swing of the differential signal on PAD and PADX depends upon the level of VDD, i.e., the level of VDD determines the output characteristics of the differential signal on PAD and PADX.

Figure 3:
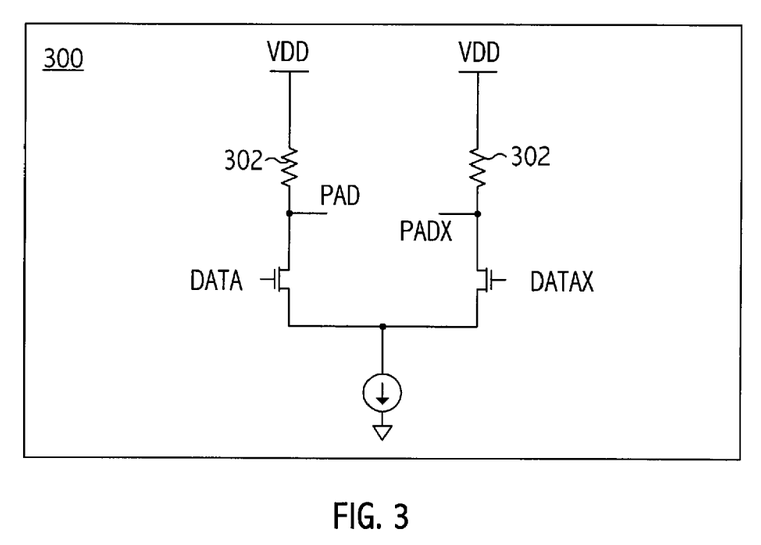
FIG. 3 illustrates a circuit diagram of an exemplary current mode driver.

Referring to FIG. 3, another exemplary driver circuit, e.g., current mode driver circuit 300, is configured to receive a differential data signal on a differential node (e.g., the differential data signal received on differential node DATA and DATAX) and supply a version of that signal to a differential output node (e.g., the differential node PAD and PADX). Resistors 302 (e.g., having a resistance equal to approximately 50 Ohms) are used to match the characteristic impedance of a respective transmission line (e.g., a differential impedance of approximately 100 Ohms), in order to reduce reflections. In general, the output voltage swing of the differential signal on PAD and PADX depends upon the level of current through resistors 302, i.e., the current through resistors 302 determines the output characteristics of the differential signal on PAD and PADX. In general, a current mode driver circuit can operate with lower signal voltages and at higher frequencies at lower supply voltages than a voltage mode driver circuit. In addition, at least some equalization techniques (e.g., feed-forward equalization filter techniques, also known as de-emphasis equalization) are easily implemented using a current mode driver circuit. However, a voltage mode driver circuit consumes substantially less static power than a current mode driver circuit.

Figure 4:
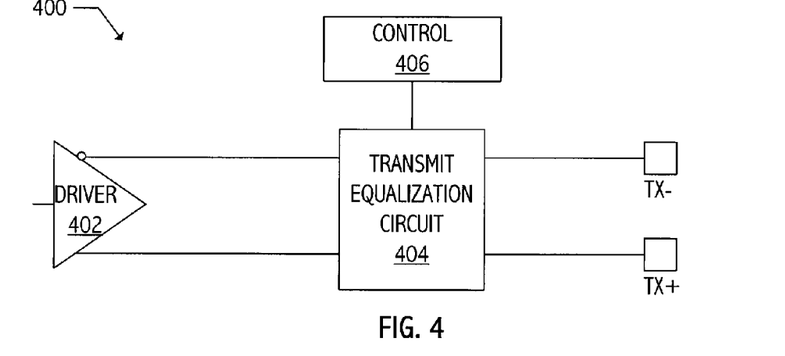
FIG. 4 illustrates a block diagram of an exemplary portion of a transmit interface consistent with at least one embodiment of the invention.
Figure 5:
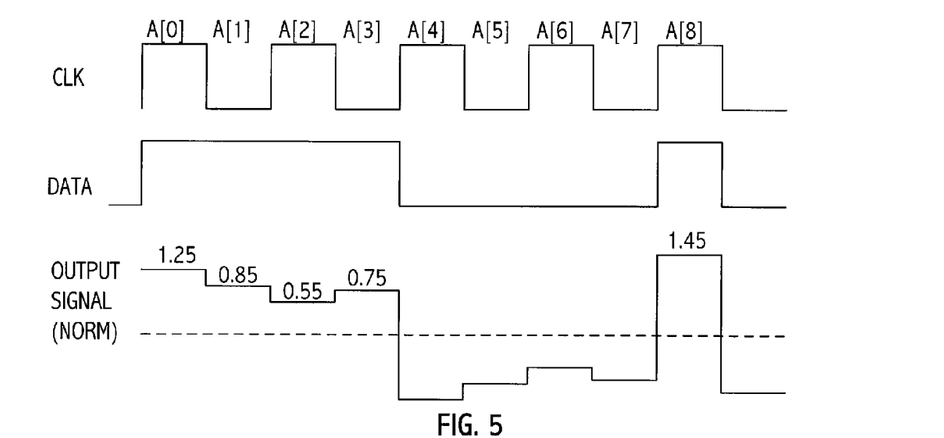
FIG. 5 illustrates exemplary waveforms consistent with at least one embodiment of the invention.
Figure 6:
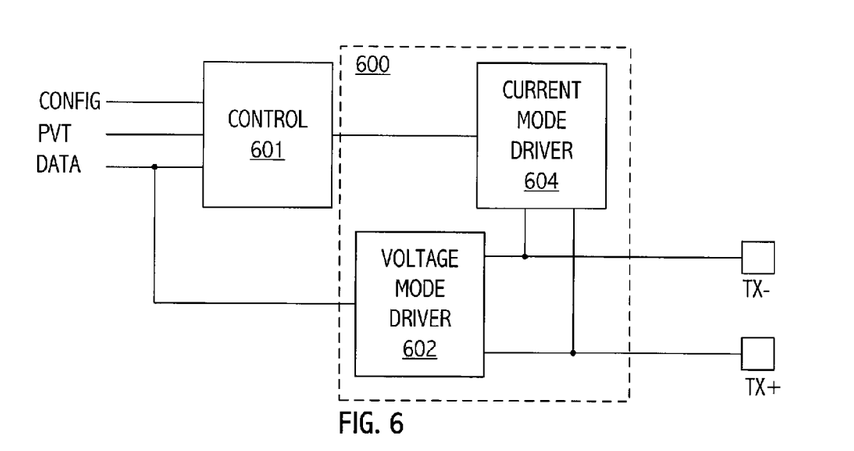
FIG. 6 illustrates a block diagram of an exemplary portion of a transmit interface consistent with at least one embodiment of the invention.

Referring to FIGS. 4-6, in at least one embodiment, an exemplary transmit interface 400 includes a driver circuit (e.g., driver circuit 402) and a transmit equalization circuit (e.g., transmit equalization circuit 404). Note that transmit interface 400 may also include electrostatic discharge protection circuitry or other circuitry (not shown). Transmit equalization circuit 404 includes circuitry controllable by control circuit 406 to scale, by a selectable amount, the voltage swing of a signal supplied to differential output node TX+ and TX−. In at least one embodiment transmit interface 400, de-emphasis equalization is implemented, although techniques described herein may be applicable to other signal processing operations.

In at least one embodiment of transmit interface 400, a transmitter equalization circuit 404 implements a pre-cursor de-emphasis equalization operation (i.e., the amplitude changes in a bit-time prior to a present bit-time in response to a value of the signal in the present bit-time) and a post-cursor de-emphasis equalization operation (i.e., the amplitude changes in a bit-time subsequent to the present bit-time in response to a value of the signal in the present bit-time). Control bits in a transmitter configuration register (not shown) may enable respective ones of the pre-cursor and post-cursor de-emphasis equalization operations and determine the number of steps of de-emphasis equalization associated with each of the equalization operations. For example, five control bits in a transmit configuration register correspond to 32 steps of post-cursor de-emphasis, which range from no de-emphasis to 50% scaling of the output voltage swing. Similarly, another five control bits in a transmit configuration register (not shown) correspond to 32 steps of pre-cursor de-emphasis. Transmit configuration settings for the pre-cursor and post-cursor de-emphasis equalization operations may be configured according to a selected data rate of an associated data communications interface. Techniques for configuring equalization parameters associated with transmit equalization circuit 403 are described in patent application Ser. No. 11/614,529, filed Dec. 21, 2006, entitled "In-band Method to Configure Equalization Levels," which application is hereby incorporated by reference.

An exemplary communications interface implements transmit-side equalization using a digital finite impulse response (i.e., FIR) filter. An exemplary 3-tap equalization filter may have the following transfer function:

$$H(z)=1+b1 \times z^{-1}+b2 \times z^{-2}+b3 \times z^{-3}.$$

Such an equalization operation may be implemented using current sources and memory elements (e.g., flip-flops), and is easily integrated with a current mode driver.

In at least one embodiment of transmit interface 110 of FIG. 1, an output transmit waveform may be consistent with the following relationship:

$$V_{TX}=V_{PK}[d_{[n+1]}c_{[0]}+d_{[n]}c_{[1]}+d_{[n-1]}c_{[2]}],$$

where $V_{PK}$ is the peak output voltage of the transmitter, $d_{[n]}$ represents the present value of the data being transmitted, with +1 for logic '1' and −1 for logic '0,' and coefficients c[0]

and c[2] are the pre-cursor and post-cursor coefficients, respectively, the magnitude of the coefficients c[j] summing to 1.0.

Referring to FIG. 5, an exemplary equalization technique converts nine bit-times of data (e.g., DATA associated with bit-times A[0], A[1], . . . , A[8] of CLK), into an associated output signal (e.g., normalized voltages of OUTPUT SIGNAL) for communication from transmit interface 110 on an individual path of communication paths 106 to receiver interface 114. Note that the voltage levels of OUTPUT SIGNAL may vary in small quantities (e.g., 32 voltage levels ranging between 300 mV to 600 mV, peak-to-peak). A driver circuit having control features to generate an output signal having a response consistent with such small voltage steps associated with a particular equalization operation may be difficult to implement using a voltage mode driver. However, a current mode driver circuit easily handles variation of the output voltage in small quantities.

Referring to FIG. 6, an exemplary transmit interface includes a hybrid driver circuit 600, which includes a current mode driver circuit 604 and a voltage mode driver circuit 602. Voltage mode driver circuit 602 establishes a signal according to digital data associated with a present bit-time of the data signal. In at least one embodiment of voltage mode driver circuit 602, the signal is established based on a target output impedance. Voltage mode driver circuit 602 may dynamically adjust the output impedance of hybrid driver circuit 600 according to control signals generated by control circuit 601. In at least one embodiment of hybrid driver 600, those control signals are determined at power-up or in a configuration state, based on a measured output impedance of driver circuit 600. In general, the measured output impedance of hybrid driver circuit 600 may vary from a target output impedance based on process, voltage, and/or temperature variations of an integrated circuit including hybrid driver circuit 600. Control circuit 601 effectively configures voltage mode driver circuit 602 (e.g., by selecting an appropriate number of resistive circuit portions) to have a target output impedance, as described further below with respect to FIGS. 7A and 7B. Control circuit 601 configures current mode driver circuit 604 to adjust the voltage level of the signal to generate the final output waveform based on the present bit-time and at least one other bit-time, consistent with a transmit equalization operation and described further below with respect to FIG. 8. Note that control circuit 601 may include control logic circuits and/or control firmware or software executing on a general purpose processing integrated circuit.

Figure 7A:
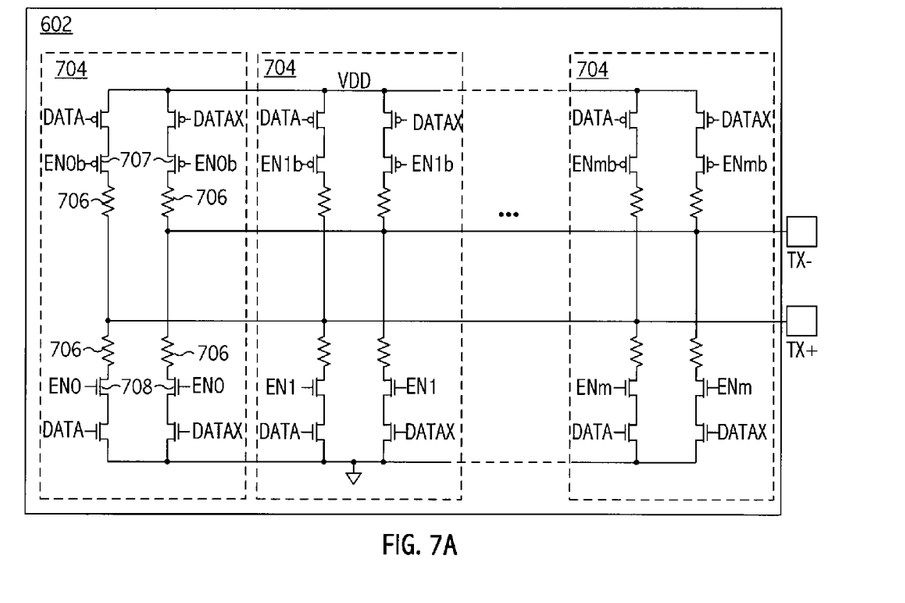
FIG. 7A illustrates a circuit diagram of an exemplary voltage mode circuit portion of the exemplary transmit interface of FIG. 6 consistent with at least one embodiment of the invention.

Referring to FIG. 7A, an exemplary voltage mode driver circuit 602 includes m resistive circuit portions 704. In at least one embodiment of voltage mode driver circuit 604, m is 32 and each resistor 706 in combination with corresponding pull-up or pull-down transistors has an impedance of approximately 1600 Ohms. In at least one embodiment of voltage mode driver circuit 604, devices 707 and 708 are not included and the output impedance of the associated driver circuit is fixed at substantially 50 Ohms. In at least one embodiment of voltage mode driver circuit 604, at least some of the resistive circuit portions 704 include devices 707 and 708 and the output impedance of an associated hybrid driver is selectable. For example, m may be 44 and each resistor 706 in combination with corresponding pull-up or pull-down transistors has an impedance of approximately 1600 Ohms, for a target output impedance of approximately 50 Ohms. However, at least some resistive circuit portions 704 are selectively enabled to vary the output impedance of an associated hybrid driver circuit e.g., according to associated ones of control signals EN0, EN1, . . . , ENm. Individual resistive circuit portions 704 that are not selected are in a high-impedance state (i.e., are effectively disabled). Control signals may be dynamically configured according to a target output impedance, e.g., by measuring the actual output impedance of hybrid driver 600 when TX+ and TX− are coupled to an off-chip precision resistor, thereby accounting for process, voltage, and/or temperature variations of the integrated circuit including hybrid driver circuit 600 of FIG. 6.

Figure 7B:
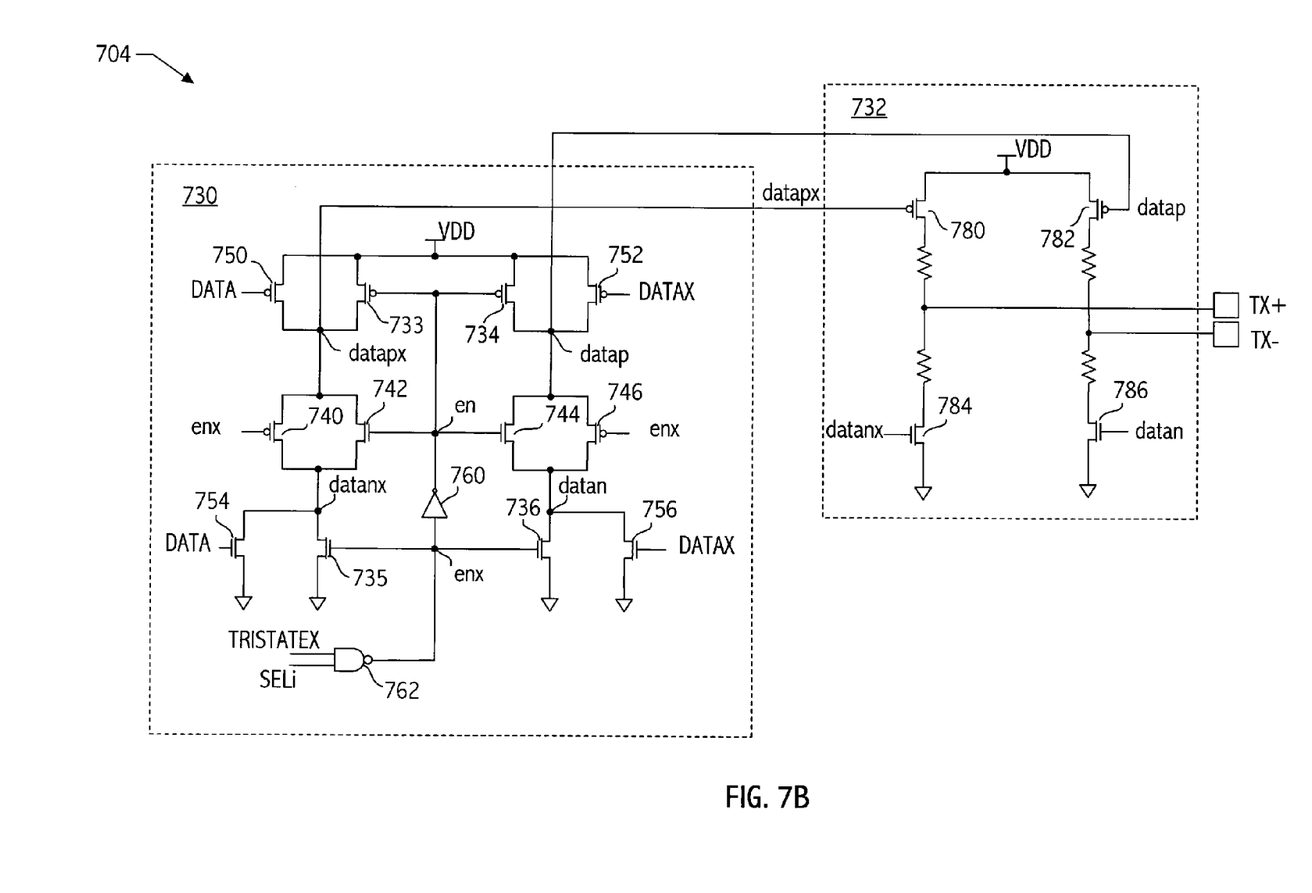
FIG. 7B illustrates a circuit diagram of an exemplary resistive circuit portion 704 of a voltage mode circuit portion of FIG. 6 consistent with at least one embodiment of the invention.

Referring to FIG. 7B, an individual resistive circuit portion 704 consistent with at least one embodiment of voltage mode driver circuit 604 includes input circuit portion 730 and output circuit portion 732. Input circuit portion 730 receives differential data signal (e.g., DATA and DATAX) and provides at least one inverted version of the differential data signal to output circuit portion 732. Output circuit portion 732 includes resistors having a value (e.g., 1550 Ohms) that in combination with one or more corresponding pull-up or pull-down transistors has an impedance (e.g., 1600 Ohms) based on a total target output impedance (e.g., of approximately 50 Ohms) of m resistive circuit portions 704 coupled in parallel.

In at least one embodiment of resistive circuit portion 704, inverting circuits (e.g., the inverting circuit formed by devices 750 and 754 and the inverting circuit formed by devices 752 and 756), include respective transmission gates (e.g., the transmission gate formed by devices 740 and 742 and the transmission gate formed by devices 744 and 746). The individual inverting circuits generate differential data signals (e.g., signals on nodes datap and datapx and datan and datanx) that are inverted versions of the signal on DATA and DATAX. Those differential data signals drive output circuit portion 732 to invert those differential data signals and to drive a differential output node (e.g., TX+ and TX−) with substantially no crowbar current. That is, output circuit portion 732 conducts effectively no current from power supply node (e.g., VDD) to ground resulting from both a pull-up device and a corresponding pull-down device being simultaneously turned on in output circuit portion 732. The transmission gate formed by devices 740 and 742 and devices 744 and 746 introduce a delay between nodes datapx and datanx and between nodes datap and datan, respectively. Accordingly, the signals on nodes datap and datapx have rising transitions effectively earlier than the rising transitions of the signals on nodes datan and datanx, respectively. The signals on nodes datan and datanx have falling transitions effectively earlier than the falling transitions of the signals on nodes datap and datapx, respectively.

In at least one embodiment, resistive circuit portion 704 can be effectively disabled (e.g., configured as a substantially high-impedance). For example, resistive circuit portion 704 can be one of m resistive circuit portions 704 that are all effectively disabled simultaneously and/or resistive circuit portion 704 can be individually, effectively disabled while others of m resistive circuit portions 704 are effectively enabled. A logical combination of a signal that effectively enables m resistive circuit portions 704 (e.g., TRISTATEX) and a signal that effectively enables an individual one of m resistive circuit portions 704 (e.g., SELi) results in control signals en and enx. Those control signals control the transmission gates in the inverting circuits (e.g., the transmission gate formed by devices 740 and 742 and the transmission gate formed by devices 744 and 746) to effectively disable the corresponding inverter circuits. Control signals en and enx also enable devices 733, 734, 735, and 736 to effectively disable the devices in output circuit portion 732 (e.g., devices 780, 782, 784, and 786), when the resistive circuit portion 704 is effectively disabled (e.g., when TRISTATEX='0' and/or SELi='0'). Note that the circuit implementation of FIG. 7B is exemplary only and other circuit implementations that perform the same functions are consistent with the invention described herein.

Figure 8:
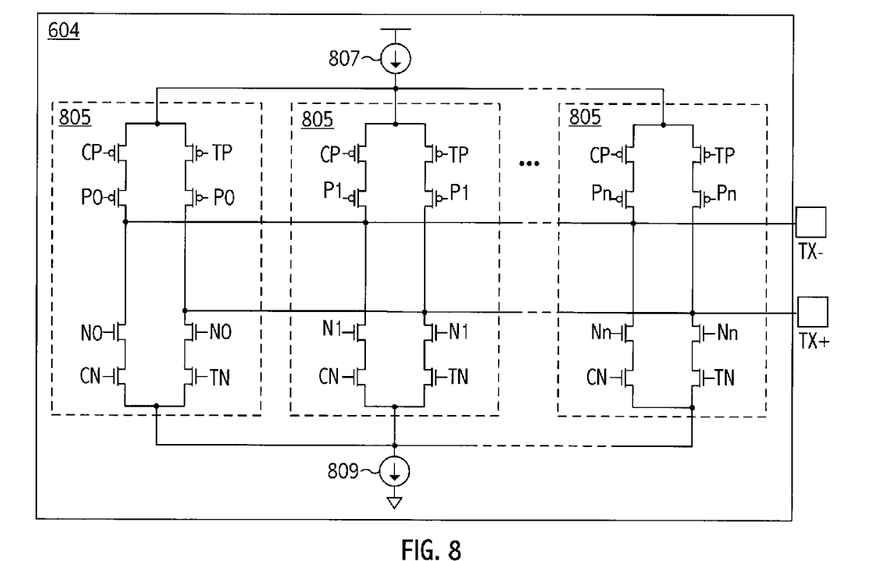
FIG. 8 illustrates a block diagram of an exemplary current mode circuit portion of the exemplary transmit interface of FIG. 6 consistent with at least one embodiment of the invention.

Referring to FIG. 8, an exemplary current mode driver circuit 604 includes n current tap portions 805. The number of current tap portions 805, n, included in current mode driver circuit 604 may be based on a number of bits of programmability. For example, $n=2^p-1$ (e.g., n=31) instantiations of current tap portion 805 are included in an exemplary current mode driver circuit 604, providing p (e.g., five) bits of programmability to a transmit equalization technique. That is, 32 distinct output voltage level adjustments may be applied to the output voltage level. In at least one embodiment, when an equalization operation results in adjusting the output voltage level generated by voltage mode driver circuit 602 by 0V, then all of the circuit portions 805 are effectively disabled. Otherwise, the output voltage may be adjusted by selectively enabling appropriate ones of the n current tap portions 805. Effectively disabled ones of the n current tap portions 805 are configured to be in a high-impedance state.

Control signals P0, P1, . . . , Pn−1, and, N0, N1, . . . , Nn−1 select a number of active current tap portions 805. Those control signals may be complementary, one-hot encoded control signals, appropriate bits of complementary binary codes, appropriate bits of complementary thermometer codes (which may be used to decrease charge-sharing and/or implement a monotonic function), any combination thereof, or other suitable code for controlling current tap portions 805. The number of active ones of the current tap portions may be based on a type of equalization operation implemented at a particular data communications rate. A full-swing output signal corresponds to the strength control signals P0, P1, . . . , Pn, being '0' and, N0, N1, . . . , Nn, being '1'. However, other combinations of these control signals may provide the same functionality.

Referring to FIGS. 6 and 8, in at least one embodiment of driver 600, control circuit 601 generates the control signals for voltage mode driver circuit 602 and current mode driver circuit 604 to substantially reduce or eliminate crowbar current (i.e., a current that exists when both a pull-up device and a corresponding pull-down device are simultaneously turned on) associated with current mode driver 604. For example, control circuit 601 may generate control signals P0, P1, . . . , Pn, and N0, N1, . . . , Nn to effectively disable one set of devices before (e.g., 25 picoseconds before) effectively enabling another set of devices, thereby reducing or eliminating effective current paths between current source 807 and current sink 809 within circuit 604. Control circuit 601 may similarly control DATA and DATAX to substantially reduce or eliminate a crowbar current. Note that although current tap portions 805 are illustrated as having identical transistor sizes, other embodiments of hybrid driver circuit 600 may include transistors having binary-weighted sizes, or other suitable sizes to implement a particular equalization operation. Current source 807 and current sink 809 may be generated by precision digital-to-analog converters, or other suitable technique.

In at least one embodiment, hybrid driver circuit 600, implements a single de-emphasis tap, i.e., n=1 and only a single current tap portion 805 is included in current mode driver circuit 604. Complementary control signal pairs (e.g., complementary control signal pair TN and CP and complementary control signal pair TP and CN) are generated by control circuit 601 based on an exemplary de-emphasis technique, e.g., TN=DATAOUT[n−1] && DATAOUT[n] and TP=DATAOUTX[n−1]+DATAOUT[n], where DATAOUT[n] is a bit-value on TX+ and TX− for a bit-period n and DATAOUT[n−1] is a bit-value on TX+ and TX− one bit-period prior to bit-period n. Thus, current mode driver circuit 604 adjusts the voltage on TX+ and TX− according to a de-emphasis technique by adjusting the amount of current flowing through TX+ and TX−. For example, when DATA='1,' P0='0,' and N0='1', current source 807 sources current into node TX+ and current sink 809 sinks current from node TX− to increase the current through the load and thereby increase the output voltage level from the voltage level established by voltage mode driver 602. When DATA='0,' P0='0,' and N0='1,' current source 807 sources current into node TX− and current sink 809 sinks current from node TX+ to decrease the current through the load and thereby decrease the output voltage level from the voltage level established by voltage mode driver 602.

Figure 9A:
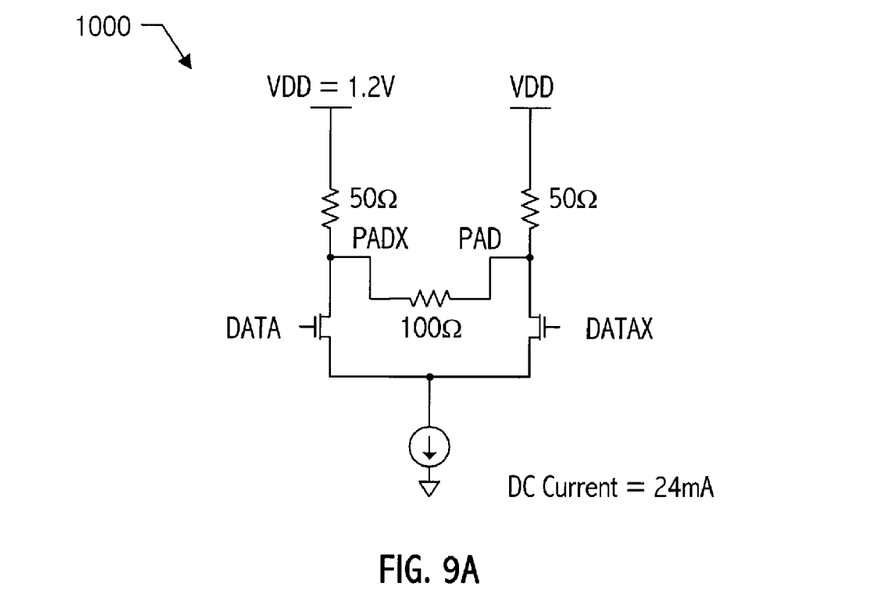
FIG. 9A illustrates an exemplary current mode driver circuit.
Figure 9B:
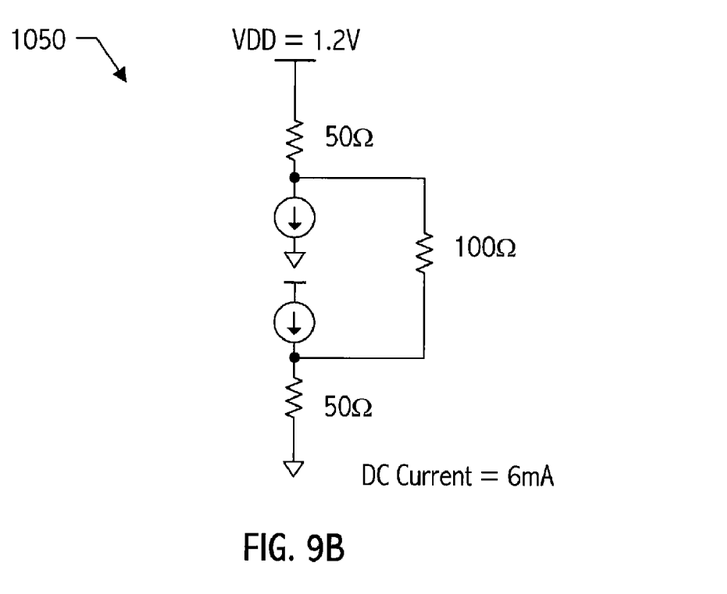
FIG. 9B illustrates an exemplary hybrid driver circuit consistent with at least one embodiment of the invention.

Referring to FIGS. 9A and 9B, an exemplary current mode driver under nominal conditions and coupled to a 1.2V power supply node and differential termination at the receive side of 100 Ohms (e.g., current mode driver circuit 1000), consumes approximately 24 mA of DC current. In contrast, an exemplary hybrid driver 600, under nominal conditions, coupled to a 1.2V power supply node, and differential termination at the receive side of 100 Ohms (e.g., hybrid driver circuit 1050), consumes only 6 mA of DC current. Thus, hybrid driver 600 may have reduced power consumption as compared to a current mode driver. Techniques described herein may be used in voltage margining applications, e.g., voltage margining techniques described in U.S. patent application Ser. No. 11/668,010, filed Jan. 29, 2007, entitled "Transmitter Voltage and Receiver Time Margining," which application is hereby incorporated by reference.

While circuits and physical structures are generally presumed, it is well recognized that in modern semiconductor design and fabrication, physical structures and circuits may be embodied in computer-readable descriptive form suitable for use in subsequent design, test or fabrication stages. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer-readable medium includes at least disk, tape, or other magnetic, optical, semiconductor (e.g., flash memory cards, ROM), or electronic medium.

The description of the invention set forth herein is illustrative, and is not intended to limit the scope of the invention as set forth in the following claims. For example, while the invention has been described in an embodiment in which the current mode circuit portion of the hybrid driver circuit implements an equalization operation, one of skill in the art will appreciate that the teachings herein can be utilized to implement other signal processing operations. Variations and modifications of the embodiments disclosed herein, may be made based on the description set forth herein, without departing from the scope and spirit of the invention as set forth in the following claims.

What is claimed is:

1. An apparatus comprising:
   a differential node;
   a driver circuit configured to generate a signal on the differential node, the driver circuit comprising:
   a first circuit portion configured to generate a first signal on the differential node based, at least in part, on a data signal, the first signal having a voltage swing based, at least in part, on a voltage on a power supply node; and at least a second circuit portion configured to generate a current through the differential node based, at least in part, on a first bit-time of the data signal and an equalization operation, thereby adjusting the voltage swing of the signal, wherein the first bit-time of the data signal is a present bit-time of the data signal and the current is based, at least in part, on the first bit-time and at least a second bit-time of the data signal, the at least a second bit-time of the data signal including at least one of a bit-time of the data signal prior to the first bit-time and a bit-time of the data signal subsequent to the first bit-time.

2. The apparatus, as recited in claim 1, wherein the first circuit portion comprises a plurality of resistive circuit portions, individual ones of the plurality of resistive circuit portions being selectively enabled to adjust the output impedance of the driver circuit.

3. The apparatus, as recited in claim 2, wherein the output impedance of the driver circuit is adjusted based, at least in part, on a target output impedance of the driver circuit and a measured output impedance of the driver circuit.

4. The apparatus, as recited in claim 1, wherein the first circuit portion comprises at least one pair of devices coupled between a power supply node and a ground node, the pair of devices including at least one device having a first conductivity type and at least one device having a second conductivity type opposite to the first conductivity type and coupled in series with the device of the first conductivity type.

5. The apparatus, as recited in claim 1, wherein the voltage on the power supply node is approximately 1.2 V, the driver circuit has an output impedance of approximately 50 Ohms and the total static power dissipation of the driver circuit is approximately 6 mA.

6. An apparatus comprising:
a differential node;
a driver circuit configured to generate a signal on the differential node, the driver circuit comprising:
 a first circuit portion configured to generate a first signal on the differential node based, at least in part, on a data signal, the first signal having a voltage swing based, at least in part, on a voltage on a power supply node; and
at least a second circuit portion configured to generate a current through the differential node based, at least in part, on a first bit-time of the data signal and an equalization operation, thereby adjusting the voltage swing of the signal,
wherein the second circuit portion comprises:
 a current source coupled to a first common node;
 a current sink coupled to a second common node; and
 a plurality of circuit portions coupled between the first and second common nodes, individual ones of the plurality of circuit portions being coupled in parallel to each other and configured to be selectively enabled in response to a corresponding control signal.

7. The apparatus, as recited in claim 6, wherein the first bit-time of the data signal is a present bit-time of the data signal and the current is based, at least in part, on the first bit-time and at least a second bit-time of the data signal including at least one of a bit-time of the data signal prior to the first bit-time and a bit-time of the data signal subsequent to the first bit-time.

8. The apparatus, as recited in claim 6, wherein an individual one of the plurality of circuit portions comprises:
at least a first pair of devices having a first conductivity type and being responsive to a first differential control signal, individual devices of the at least a first pair of devices being coupled to the first common node; and
at least a second pair of devices having a second conductivity type opposite to the first conductivity type and being responsive to a second differential control signal, individual devices of the at least a second pair of devices being coupled to the second common node,
wherein the first and second differential control signals are complementary to each other and are based, at least in part, on the data signal.

9. The apparatus, as recited in claim 8, wherein an individual one of the plurality of circuit portions further comprises:
at least a third pair of devices having the first conductivity type and being coupled between respective devices of the at least a first pair of devices and the differential node, individual devices of the at least a third pair of devices being responsive to a third differential control signal; and
at least a fourth pair of devices having the second conductivity type and being coupled between respective devices of the at least a second pair of devices and the differential node, individual devices of the at least a fourth pair of devices being responsive to a fourth differential control signal.

10. The apparatus, as recited in claim 9, wherein the third and fourth differential control signals are based, at least in part, on a number of units of voltage swing adjustment selected from a total number of units of voltage swing adjustment.

11. The apparatus, as recited in claim 9, wherein the third and fourth differential control signals are based, at least in part, on the first bit-time of the data signal and the equalization operation.

12. The apparatus, as recited in claim 6, wherein at least one of the current source and current sink comprises a digital-to-analog converter circuit.

13. A method for generating a signal on a differential node comprising:
generating an output signal on the differential node based, at least in part, on a data signal, the output signal having a voltage swing based, at least in part, on a voltage on a power supply node; and
adjusting the voltage swing by establishing a differential current through the differential node based, at least in part, on a first bit-time of the data signal and an equalization operation; and
selectively adjusting an output impedance of a driver circuit based, at least in part, on a target output impedance of the driver circuit and a measured output impedance of the driver circuit.

14. The method, as recited in claim 13, wherein the selectively adjusting the output impedance comprises selectively enabling individual ones of a plurality of resistive circuit portions coupled in parallel with each other and coupled to the differential node.

15. A method for generating a signal on a differential node comprising:
generating an output signal on the differential node based, at least in part, on a data signal, the output signal having a voltage swing based, at least in part, on a voltage on a power supply node; and adjusting the voltage swing by establishing a differential current through the differential node based, at least in part, on a first bit-time of the data signal and an equalization operation; and wherein adjusting the voltage swing comprises:

selectively enabling individual ones of a plurality of current portions, based, at least in part, on an equalized version of the data signal.

16. The method, as recited in claim 15, wherein generating the output signal comprises:

selectively adjusting an output impedance of a driver circuit based, at least in part, on a target output impedance of the driver circuit and a measured output impedance of the driver circuit.

17. The method, as recited in claim 15, wherein the amount of voltage swing adjustment is based, at least in part, on the first bit-time of the data signal and at least a second bit-time of the data signal, the second bit-time of the data signal including at least one of a bit-time of the data signal prior to the first bit-time and a bit-time of the data signal subsequent to the first bit-time.

18. An apparatus comprising:

means for generating an output signal on a differential node based, at least in part, on a data signal, the output signal having a voltage swing based, at least in part, on a voltage on a power supply node; and means for adjusting the voltage swing by establishing a differential current through the differential node based, at least in part, on a first bit-time of the data signal and an equalization operation;

wherein the means for adjusting the voltage swing comprises:

means for generating a predetermined static current; and means for selecting an amount of voltage swing adjustment based, at least in part, on the first bit-time of the data signal and at least a second bit-time of the data signal, the second bit-time of the data signal including at least one of a bit-time of the data signal prior to the first bit-time and a bit-time of the data signal subsequent to the first bit-time.

19. The apparatus, as recited in claim 18, wherein the means for generating an output signal comprises:

means for selectively adjusting an output impedance of the apparatus based, at least in part, on a target output impedance of the apparatus and a measured output impedance of the apparatus.

* * * * *

UNITED STATES PATENT AND TRADEMARK OFFICE
CERTIFICATE OF CORRECTION

| | |
|---|---|
| PATENT NO. | : 7,817,727 B2 |
| APPLICATION NO. | : 11/756678 |
| DATED | : October 19, 2010 |
| INVENTOR(S) | : Rohit Kumar and Emerson S. Fang |

It is certified that error appears in the above-identified patent and that said Letters Patent is hereby corrected as shown below:

On the Title Page, Related U.S. Application Data Item (63) and Item (60) should read:

Continuation-in-part of application No. 11/668,010, filed on Jan. 29, 2007, which claims the benefit of provisional application No. 60/786,546, filed on Mar. 28, 2006.

Continuation-in-part of application No. 11/614,529, filed on Dec. 21, 2006, which claims the benefit of provisional application No. 60/786,546, filed on Mar. 28, 2006.

Signed and Sealed this
First Day of February, 2011

David J. Kappos
*Director of the United States Patent and Trademark Office*